(12) United States Patent
Algrain

(10) Patent No.: US 12,592,583 B2
(45) Date of Patent: Mar. 31, 2026

(54) REMOTE SENSING AND CONTROL AT THE POINT OF COMMON COUPLING IN AN ELECTRICAL GRID

(71) Applicant: Caterpillar Inc., Peoria, IL (US)

(72) Inventor: Marcelo C. Algrain, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/637,911

(22) Filed: Apr. 17, 2024

(65) Prior Publication Data

US 2025/0192609 A1 Jun. 12, 2025

(51) Int. Cl.
H02J 13/00 (2006.01)
H02J 3/16 (2006.01)

(52) U.S. Cl.
CPC .......... H02J 13/00006 (2020.01); H02J 3/16 (2013.01); H02J 13/00002 (2020.01)

(58) Field of Classification Search
CPC ... H02J 13/00006; H02J 13/00002; H02J 3/16
See application file for complete search history.

(56) References Cited

U.S. PATENT DOCUMENTS

| | | | |
|---|---|---|---|
| 9,377,803 B2 | 6/2016 | Watanabe et al. | |
| 10,148,089 B2 | 12/2018 | Sun et al. | |
| 10,862,304 B2 | 12/2020 | Kawachi et al. | |
| 11,855,458 B2 * | 12/2023 | Christensen | ............ H02J 3/381 |
| 11,952,982 B2 | 4/2024 | Brombach | |
| 2015/0137520 A1 * | 5/2015 | Garcia | ...................... H02J 3/50 |
| | | | 290/44 |
| 2023/0089279 A1 * | 3/2023 | Wu | .......................... H02J 3/381 |
| | | | 307/82 |
| 2023/0187942 A1 | 6/2023 | Knobloch et al. | |

FOREIGN PATENT DOCUMENTS

| | | |
|---|---|---|
| CA | 2605908 A1 | 6/2008 |
| CA | 3232044 A1 | 3/2023 |
| EP | 2161444 A2 | 3/2010 |

OTHER PUBLICATIONS

U.S. Appl. No. 18/532,360, filed Dec. 7, 2023, Remote Sensing and Control at the Point of Common Couplin in an Electrical Grid.
Written Opinion and International Search Report for Int'l. Patent Appln. No. PCT/US2025/023543, mailed Jul. 18, 2025 (06 pgs).

* cited by examiner

*Primary Examiner* — Carlos Amaya

(57) ABSTRACT

Techniques are described for compensating for differences in conditions at the PoC and PCC by determining an adjustment to a PoC setpoint that adjusts a value of an electrical parameter at the PCC so as to approximate or equal a PCC setpoint. In some examples, for voltage regulation and protection functions (mandatory trips), the voltages and/or currents are sensed at the PCC (remote sensing) and fed to a DER controller to produce the appropriate action. For power delivery at the PCC, active and reactive power can be sensed at the PCC and measurements are fed to the DER controller.

20 Claims, 9 Drawing Sheets

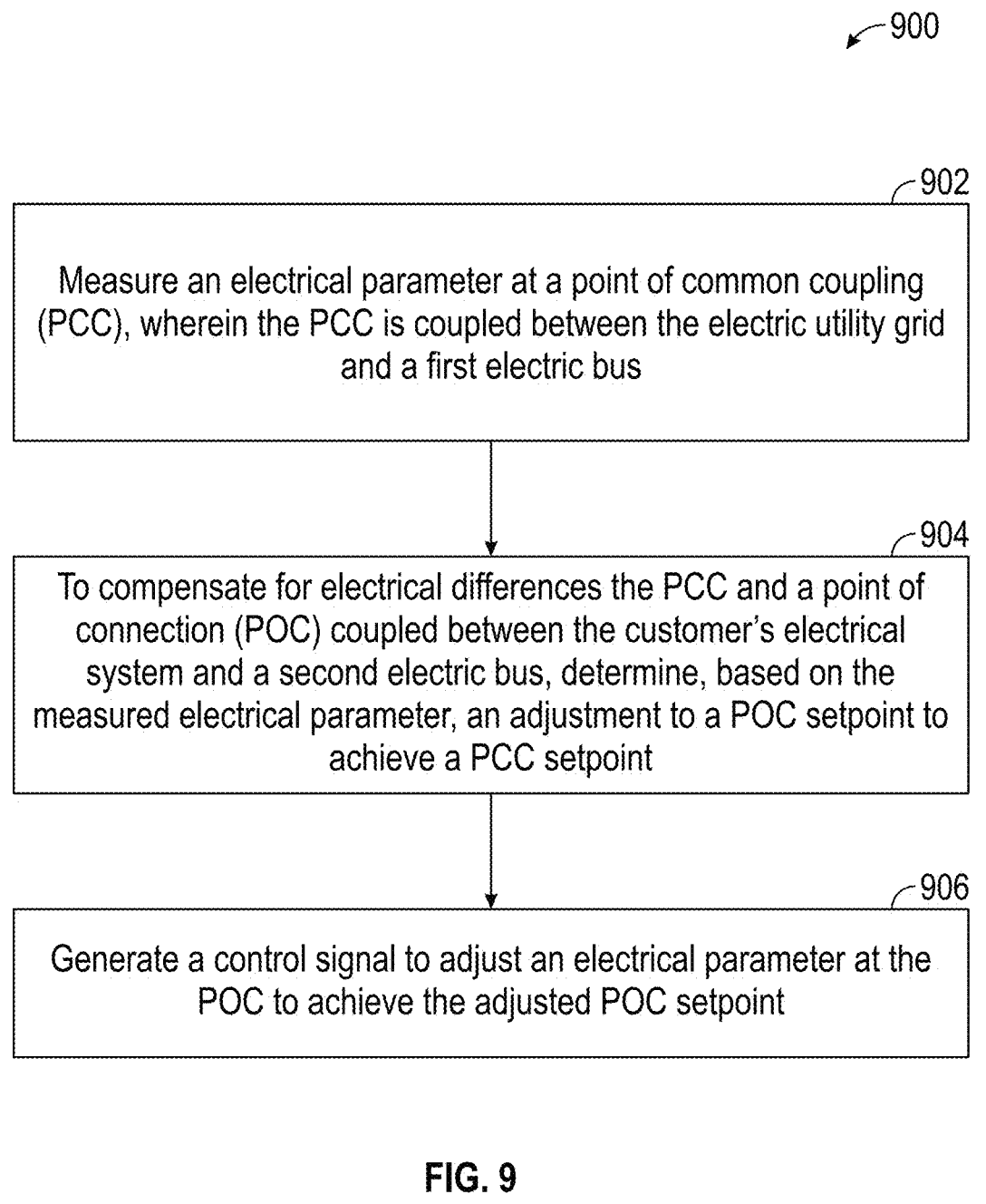

900

902

Measure an electrical parameter at a point of common coupling (PCC), wherein the PCC is coupled between the electric utility grid and a first electric bus

904

To compensate for electrical differences the PCC and a point of connection (POC) coupled between the customer's electrical system and a second electric bus, determine, based on the measured electrical parameter, an adjustment to a POC setpoint to achieve a PCC setpoint

906

Generate a control signal to adjust an electrical parameter at the POC to achieve the adjusted POC setpoint

FIG. 9

REMOTE SENSING AND CONTROL AT THE POINT OF COMMON COUPLING IN AN ELECTRICAL GRID

TECHNICAL FIELD

This disclosure relates generally to power distribution networks and more particularly to techniques for controlling distributed energy resources connected to an electrical grid.

BACKGROUND

Electrical power distribution systems have evolved to incorporate distributed energy resources (DERs) that connect to the grid at different points. DERs include electrical generation assets, such as generator sets (or "gensets"), and renewable energy sources, such as wind turbines, solar panels, and energy storage systems such as batteries. DERs can provide clean energy and improve reliability through localized generation. However, this distributed model also introduces complexities in maintaining required voltage levels and power quality across the grid. Grid operators thus specify strict standards and codes that must be adhered to at the point where a DER interconnects with the broader distribution system, known as the point of common coupling (PCC).

DERs are often installed at some distance from the PCC at their own point of connection (PoC). Losses can occur between the PoC and PCC due to impedance, transformers, parasitic loads, etc. DER controllers generally regulate voltage and power at the PoC. However, the existence of losses means that meeting control requirements at the PoC does not guarantee adhering to grid codes and standards at the PCC.

SUMMARY

This disclosure describes techniques for compensating for differences in conditions at the PoC and PCC by determining an adjustment to a PoC setpoint that adjusts a value of an electrical parameter at the PCC so as to approximate or equal a PCC setpoint. In some examples, for voltage regulation and protection functions (mandatory trips), the voltages and/or currents are sensed at the PCC (remote sensing) and fed to a DER controller to produce the appropriate action. For power delivery at the PCC, active and reactive power can be sensed at the PCC and measurements are fed to the DER controller.

In some aspects, this disclosure is directed to a system for controlling a distributed energy resource (DER) at an electrical interconnection between an electric utility grid and a customer's electrical system, the system comprising: a point of common coupling (PCC) coupled between the electric utility grid and a first electric bus; a point of connection (PoC) coupled between the customer's electrical system and a second electric bus, wherein the PoC and the PCC are electrically coupled; a sensor electrically coupled with the PCC and configured for measuring an electrical parameter at the PCC; and a controller configured for: determining, based on the measured electrical parameter, an adjustment to a PoC setpoint to adjust a value of the electrical parameter at the PCC so as to approximate or equal a PCC setpoint; and generating a control signal to adjust an electrical parameter at the PoC to achieve the adjusted PoC setpoint.

In some aspects, this disclosure is directed to a method for controlling a distributed energy resource (DER) at an interconnection between an electric utility grid and a customer's electrical system, the method comprising: measuring an electrical parameter at a point of common coupling (PCC), wherein the PCC is coupled between the electric utility grid and a first electric bus; to compensate for electrical differences the PCC and a point of connection (PoC) coupled between the customer's electrical system and a second electric bus, determining, based on the measured electrical parameter, an adjustment to a PoC setpoint to achieve a PCC setpoint; and generating a control signal to adjust an electrical parameter at the PoC to achieve the adjusted PoC setpoint.

In some aspects, this disclosure is directed to a system for controlling a distributed energy resource (DER) at an electrical interconnection between an electric utility grid and a customer's electrical system, the system comprising: a point of common coupling (PCC) coupled between the electric utility grid and a first electric bus; a point of connection (PoC) coupled between the customer's electrical system and a second electric bus, wherein the PoC and the PCC are electrically coupled; an electrical impedance coupled between the PCC and the PoC; a sensor electrically coupled with the PCC and configured for measuring an electrical parameter at the PCC; and a controller configured for: determining, based on the measured electrical parameter, an adjustment to a PoC setpoint to adjust a value of the electrical parameter at the PCC so as to approximate or equal a PCC setpoint; and generating a control signal to adjust an electrical parameter at the PoC to achieve the adjusted PoC setpoint to compensate for losses due to the electrical impedance.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 9 is a flow diagram of an example of a method for controlling a distributed energy resource (DER) at an interconnection between an electric utility grid and a customer's electrical system.

DETAILED DESCRIPTION

Some electrical distribution system grid codes specify that voltage regulation, power delivery, and protection requirements be met at a point of common coupling (PCC). In practice, distributed energy resources (DER), including electrical generation assets, are installed at some distance from the PCC and, as such, there may be some differences in conditions between the DER point of connection (PoC) and the PCC, such as caused by impedance, intervening transformers, local parasitic loads, etc. These differences in conditions can lead to voltage differences and losses between the PoC and the PCC. Thus, regulating voltage and power delivery at the DER terminals, e.g., PoC, would not ensure that the grid code requirements would be met at the PCC.

This disclosure describes techniques for compensating for differences in conditions at the PoC and PCC by determining an adjustment to a PoC setpoint that adjusts a value of an electrical parameter at the PCC so as to approximate or equal a PCC setpoint. In some examples, for voltage regulation and protection functions (mandatory trips), the voltages and/or currents are sensed at the PCC (remote sensing) and fed to a DER controller to produce the appropriate action. For power delivery at the PCC, active and reactive power can be sensed at the PCC and measurements are fed to the DER controller.

Figure 1:
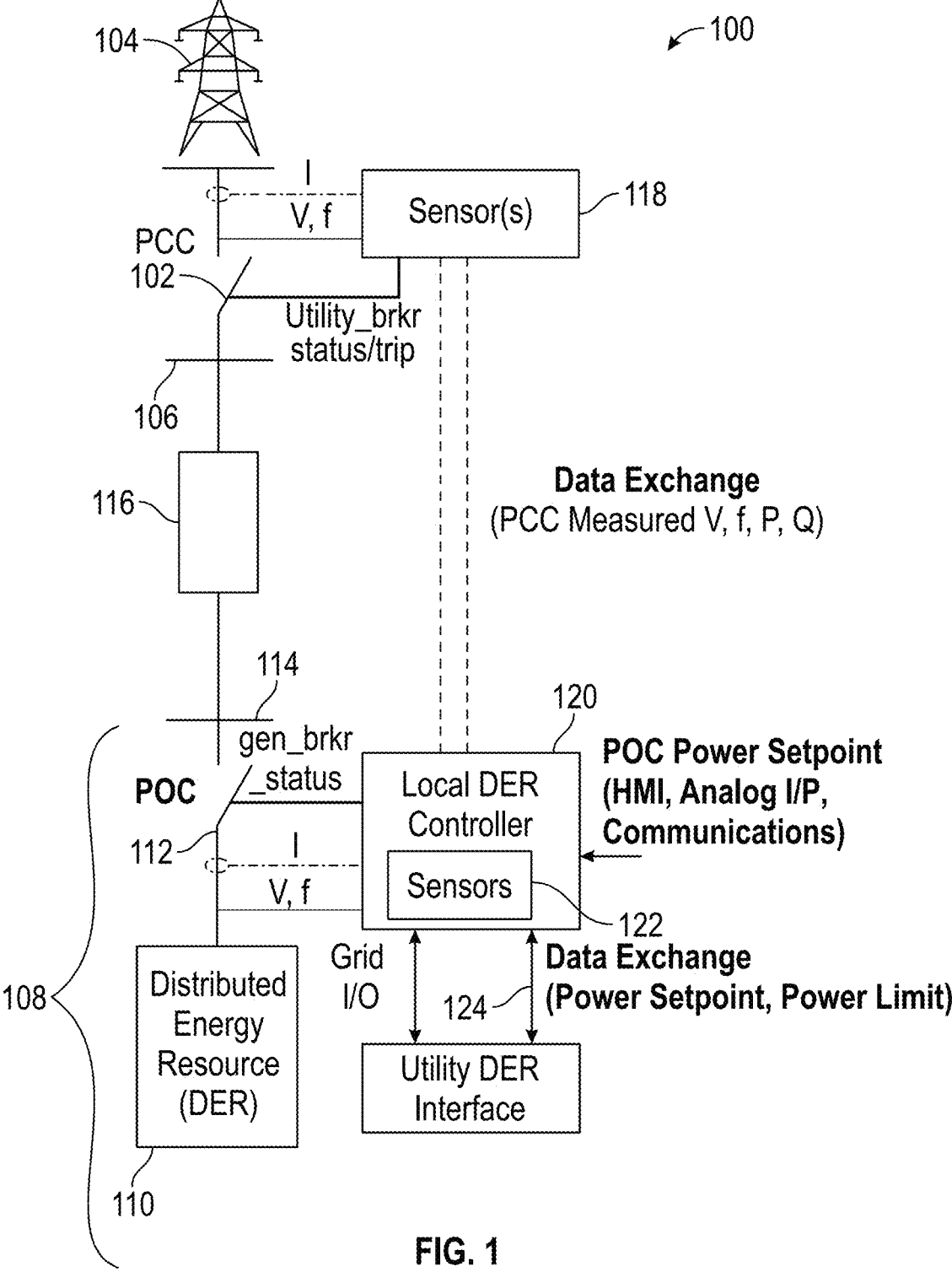
FIG. 1 is a block diagram of an example of a system for controlling a single distributed energy resource (DER) at an electrical interconnection between an electric utility grid and a customer's electrical system.

FIG. 1 is a block diagram of an example of a system for controlling a single distributed energy resource (DER) at an electrical interconnection between an electric utility grid and a customer's electrical system. The system 100 includes a point of common coupling (PCC) 102 electrically coupled between the electric utility grid 104 and a first electric bus 106.

The customer's electrical system 108 includes one or more distributed energy resources (DER) 110, such as one or more generator sets ("gensets"), one or more photovoltaic (PV) panels, one or more wind turbines, and the like. The distributed energy resource (DER) 110 is electrically coupled with a point of connection (PoC) 112. The PoC 112 is coupled between the customer's electrical system 108 and a second electric bus 114. The PCC 102 and the PoC 112 are electrically coupled via an interconnection 116. In some configurations the interconnection 116 includes a load or an electrical impedance, such as through cabling, transformers, and/or other electrical gear.

One or more sensors 118 are electrically coupled with the PCC 102 and configured for measuring an electrical parameter at the PCC, such as voltage (V), current (I), and/or frequency (f). The sensor 118 can also monitor a status of a utility breaker, for example.

The system 100 further includes a DER controller 120. The DER controller 120 is in electrical communication with the sensors 118 and, as such, can receive the electrical parameters voltage (V), current (I), and/or frequency (f)

measured at the PCC 102. In addition, the DER controller 120 is in electrical communication with one or more sensors 122 that can receive the electrical parameters voltage (V), current (I), and/or frequency (f) measured at the PoC 112. The DER controller 120 can also compute various power measurements, such as an active power measurement (P) and/or a reactive power measurement (Q) at the PCC 102 and the PoC 112, using the corresponding measured electrical parameters.

Using the techniques of this disclosure, the DER controller 120 can determine, based on a measured electrical parameter, an adjustment to a PoC setpoint to adjust a value of the electrical parameter at the PCC so as to approximate or equal a PCC setpoint. Then, the DER controller 120 can generate a control signal to adjust an electrical parameter at the PoC to achieve the adjusted PoC setpoint. For example, the DER controller 120 can generate a control signal 124 that can adjust one or more of a voltage, current, frequency at the PoC to achieve the adjusted PoC setpoint. In this manner, the DER controller 120 can compensate for differences in conditions at the PoC and PCC by determining an adjustment to a PoC setpoint that adjusts a value of an electrical parameter at the PCC so as to approximate or equal a PCC setpoint.

As a non-limiting example, assume that the PCC setpoint is a PCC power setpoint of 10 megawatts (MW). Ideally, a PoC setpoint of 10 MW would result in 10 MW of power at the PCC 102. However, because of differences in conditions at the PCC 102 and PoC 112, a PoC setpoint of 10 MW may result in less than (or more than) 10 MW at the PCC 102, such as due to electrical impedance at the interconnection 116. For example, if there are losses at the interconnection 116, then the distributed energy resource (DER) 110 needs to produce more than 10 MW of power to attain the desired PoC setpoint of 10 MW.

To produce 10 MW of power at the PCC 102, the DER controller 120 can determine, based on a measured electrical parameter, such as at the PCC 102, an adjustment to a PoC setpoint to adjust a value of the electrical parameter at the PCC so as to approximate or equal a PCC setpoint. For example, the DER controller 120 can determine that the PoC setpoint should be increased by 1 MW to adjust the power at the PCC 102 as to approximate or equal the PCC setpoint of 10 MW.

Then, the DER controller 120 can generate a control signal to adjust an electrical parameter at the PoC to achieve the adjusted PoC setpoint. For example, the DER controller 120 can generate a control signal 124 to increase a power output of one or more of the DERs, such as a genset. The distributed energy resource (DER) 110 can generate enough power to compensate for any differences between the PCC 102 and the PoC 112.

In examples in which there is an electrical impedance coupled between the PCC and the PoC, such as at the interconnection 116, the DER controller 120 can generate a control signal, e.g., control signal 124, to adjust the electrical parameter at the PoC to achieve the adjusted PoC setpoint to compensate for losses due to the electrical impedance.

Figure 2:
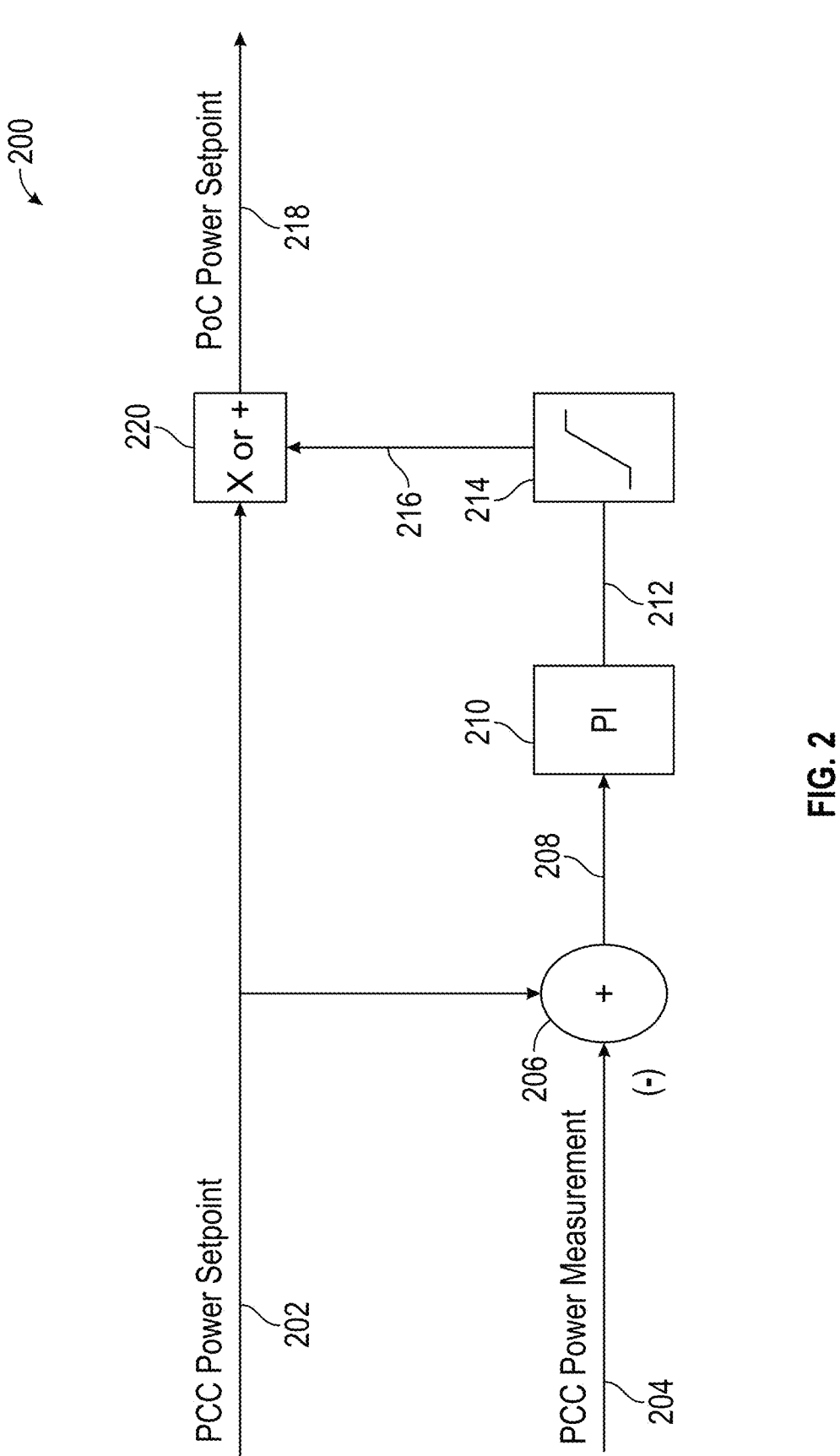
FIG. 2 is a simplified diagram of an example of a control scheme for controlling a single distributed energy resource (DER) at an electrical interconnection between an electric utility grid and a customer's electrical system.

FIG. 2 is a simplified diagram of an example of a control scheme for controlling the distributed energy resource (DER) at the electrical interconnection between the electric utility grid and the customer's electrical system, such as in FIG. 1. FIG. 2 depicts a control scheme 200 that can be used with a single DER. In the control scheme 200, the PCC setpoint is a PCC power setpoint 202.

A controller, such as the DER controller 120 of FIG. 1, can determine the PCC power setpoint 202 and determine a PCC power measurement 204 based on the electrical parameters measured by the sensors 118 of FIG. 1. The controller can then determine a difference between the PCC power measurement 204 and the PCC power setpoint 202, such as represented by a summing node 206 in FIG. 2.

Throughout this disclosure, in some examples, the PCC power measurement, such as the PCC power measurement 204, can include an active power measurement P, measured in watts. Throughout this disclosure, in other examples, the PCC power measurement, such as the PCC power measurement 204, can include a reactive power measurement Q, measured in Volt-Amps-Reactive (VARs).

In some examples, the difference 208 between the PCC power setpoint 202 and the PCC power measurement 204 can be applied to a proportional-integral (PI) controller, such as the PI controller 210 of FIG. 2, which can form part of the DER controller 120. The PI controller 210 generates a correction factor 212 to compensate for differences between the PoC and PCC.

Optionally, the control scheme 200 further includes a limiter 214 configured for receiving the correction factor 212 and restricting the correction factor 212 to values consistent with the expected differences between PoC and PCC, such as about 0.9 to about 1.1 when the combiner circuit 220 is configured for multiplying. The range of the optional limiter 214, e.g., 0.9-1.1, can accommodate differences such as power losses between the PoC 112 and the PCC 102 as well as higher powers at the PoC 112 than at the PCC 102. In examples in which the combiner circuit 220 is configured for addition, the range of the optional limiter is +100 or −100 percent of DER rated power.

In this manner, the DER controller 120 determines, based on a measured electrical parameter, an adjustment to a PoC setpoint, e.g., the PCC power setpoint 202. The DER controller 120 adjusts the PoC setpoint, e.g., the PoC power setpoint 218, such as by combining using a combiner circuit 220, the PCC power setpoint 202 by the restricted correction factor 216 (if the limiter 214 is present) or the correction factor 212. In some examples, the combiner circuit 220 is configured for multiplying, and in other examples, the combiner circuit 220 is configured for addition. The choice of using multiplication versus addition as a correction method may be application-dependent. For example, in cases where a constant impedance is present between the PoC and PCC and a nonzero active power level is to be controlled, the multiplication correction method may be more effective in achieving the desired power level at the PCC. On the other hand, in cases where internal loads are present and a zero reactive power level is to be controlled, e.g., unity power factor, the addition correction method may be used.

Then, the controller can generate a control signal to adjust an electrical parameter at the PoC to achieve the adjusted PoC setpoint. For example, the DER controller 120 can generate a control signal 124 to increase a power output of one or more of the DERs, such as a genset.

Figure 3:
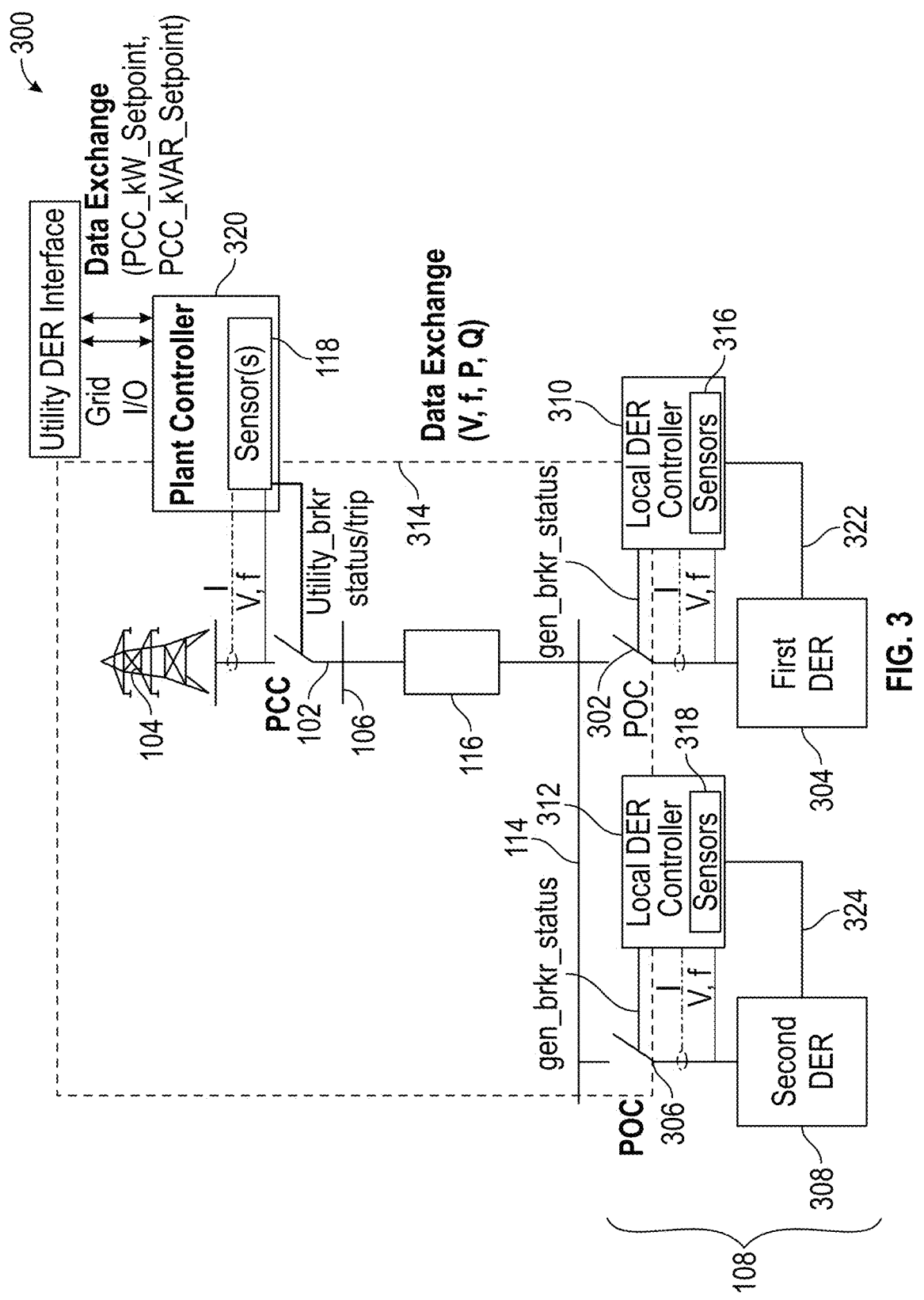
FIG. 3 is a block diagram of an example of a system for controlling multiple distributed energy resources (DER) at an electrical interconnection between an electric utility grid and a customer's electrical system.

FIG. 3 is a block diagram of an example of a system for controlling multiple distributed energy resources (DER) at an electrical interconnection between an electric utility grid and a customer's electrical system. Various components of the system 300 of FIG. 3 are similar to components of the system 100 of FIG. 1 and, as such, similar reference numbers are used. For brevity, these components will not be described in detail again.

The system 300 includes a first PoC 302 associated with a first DER 304 and a first PoC setpoint, and a second PoC 306 associated with a second DER 308 and a second PoC setpoint, where the second PoC 306 is coupled between the customer's electrical system 108 and the second electric bus 114.

The system 300 further includes a first DER controller 310 associated with the first DER 304 and a second DER controller 312 associated with the second DER controller 312. The first DER controller 310 and the second DER controller 312 are in electrical communication with each other and with the sensors 118 via a data communication system 314 and, as such, can receive the electrical parameters voltage (V), current (I), and/or frequency (f) measured at the PCC 102. The first DER controller 310 and the second DER controller 312 can also compute an active power measurement (P) and/or a reactive power measurement (Q) at the PCC 102 using the measured electrical parameters. The first DER controller 310 can be in electrical communication with one or more sensors 316 and the second DER controller 312 can be in electrical communication with one or more sensors 318, where the sensors 316 and the sensors 318 are similar to the sensors 122 of FIG. 1.

The system 300 can further include a plant controller 320 associated with the electric utility grid 104. The plant controller 320 can receive the electrical parameters voltage (V), current (I), and/or frequency (f) measured at the PCC 102 via the sensors 118.

Figure 4:
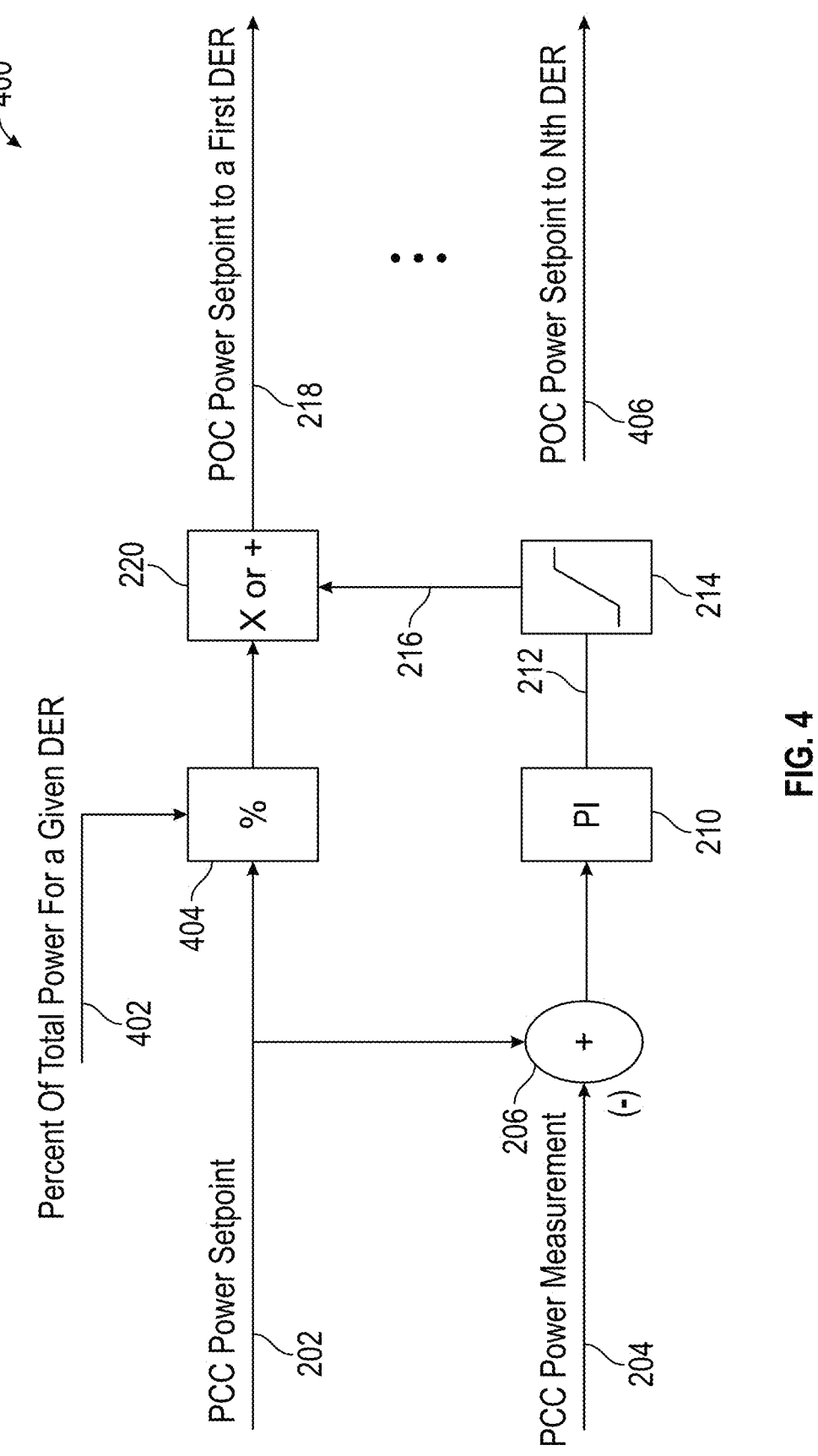
FIG. 4 is a simplified diagram of an example of a control scheme for controlling multiple distributed energy resources (DER) at the electrical interconnection between the electric utility grid and the customer's electrical system, such as in FIG. 3.

Using the techniques of this disclosure, and as shown in more detail with respect to FIG. 4, at least one of the first DER controller 310 and the second DER controller 312 is configured for receiving an allocation of power corresponding to the first DER 304 and to the second DER 308. By way of a non-limiting example, the first DER 304 may be configured to provide 40% of the power and the second DER 308 may be configured to provide the remaining 60% of the power.

A DER controller, e.g., the first DER controller 310, can then determine an adjustment to the PoC setpoint, e.g., the first PoC setpoint, to achieve the PCC setpoint by determining, based on the allocation of power corresponding to the first DER. Similarly, the second DER controller 312 can determine an adjustment to the second PoC setpoint to achieve the PCC setpoint by determining, based on the allocation of power corresponding to the second DER.

Then, the controller can generate a control signal to adjust an electrical parameter at the PoC to achieve the adjusted PoC setpoint. For example, the first DER controller 310 can generate a control signal 322 to increase a power output of one or more of the DERs, such as a genset. In other examples, the second DER controller 312 can generate a control signal 324 to increase a power output of one or more of the DERs, such as a genset.

FIG. 4 is a simplified diagram of an example of a control scheme for controlling multiple distributed energy resources (DER) at the electrical interconnection between the electric utility grid and the customer's electrical system, such as in FIG. 3. Various components of the control scheme 400 of FIG. 4 are similar to components of the control scheme 200 of FIG. 2 and, as such, similar reference numbers are used. For brevity, these components will not be described in detail again.

Either or both of the first DER controller 310 or the second DER controller 312 of FIG. 3 can use the control scheme 400 of FIG. 4 when multiple DERs are present in the customer's electrical system 108, such as shown in FIG. 3.

In the control scheme 400, the PCC setpoint is a PCC power setpoint 202. A controller, such as the first DER controller 310 of FIG. 3, can determine the PCC power setpoint 202 and determine a PCC power measurement 204 based on the electrical parameters measured by the sensors 118 of FIG. 3. The controller can then determine a difference between the PCC power measurement 204 and the PCC power setpoint 202, such as represented by a summing node 206 in FIG. 4.

In some examples, the difference 208 between the PCC power setpoint 202 and the PCC power measurement 204 can be applied to a proportional-integral (PI) controller, such as the PI controller 210 of FIG. 4, which can form part of the controller, such as the first DER controller 310 of FIG. 3. The PI controller 210 generates a correction factor 212 to compensate for differences between the PoC and PCC.

Optionally, the control scheme 400 further includes a limiter 214 configured for receiving the correction factor 212 and restricting the correction factor 212 to values consistent with the expected differences between PoC and PCC, such as about 0.9 to about 1.1 when the combiner circuit 220 is configured for multiplying. The range of the optional limiter 214, e.g., 0.9-1.1, can accommodate differences such as power losses between the PoC 112 and the PCC 102 as well as higher powers at the PoC 112 than at the PCC 102. In examples in which the combiner circuit 220 is configured for addition, the range of the optional limiter is +100 or −100 percent of rated power.

In this manner, the controller determines, based on a measured electrical parameter, an adjustment to a PoC setpoint, e.g., the PCC power setpoint 202. The controller adjusts the PoC setpoint, e.g., the PoC power setpoint 218, such as by combining using a combiner circuit 220, the PCC power setpoint 202 by the restricted correction factor 216 (if the limiter 214 is present) or the correction factor 212. In some examples, the combiner circuit 220 is configured for multiplying, and in other examples, the combiner circuit 220 is configured for addition.

In addition, to adjust PoC setpoints based on power allocation, the control scheme 400 receives a percent of total power for a given DER 402. The controller adjusts the PCC power setpoint 202 based on the percent of total power for a given DER 402, such as by multiplying the PCC power setpoint 202 by the percent of total power for a given DER 402 using a multiplier circuit 404. In this manner, the controller determines a PoC power setpoint 218 for a first DER. The controller can similarly determine a PoC power setpoint for a second DER, such as the second DER 308 of FIG. 3, and so for forth up to a PoC power setpoint 406 for an Nth DER. In this manner, the controller can determine, based on the allocation of power corresponding to the first DER and the second DER, a first PoC setpoint and a second PoC setpoint.

In alternate implementation, each DER controller calculates its PoC setpoint based on corrected power allocation for its DER.

Figure 5:
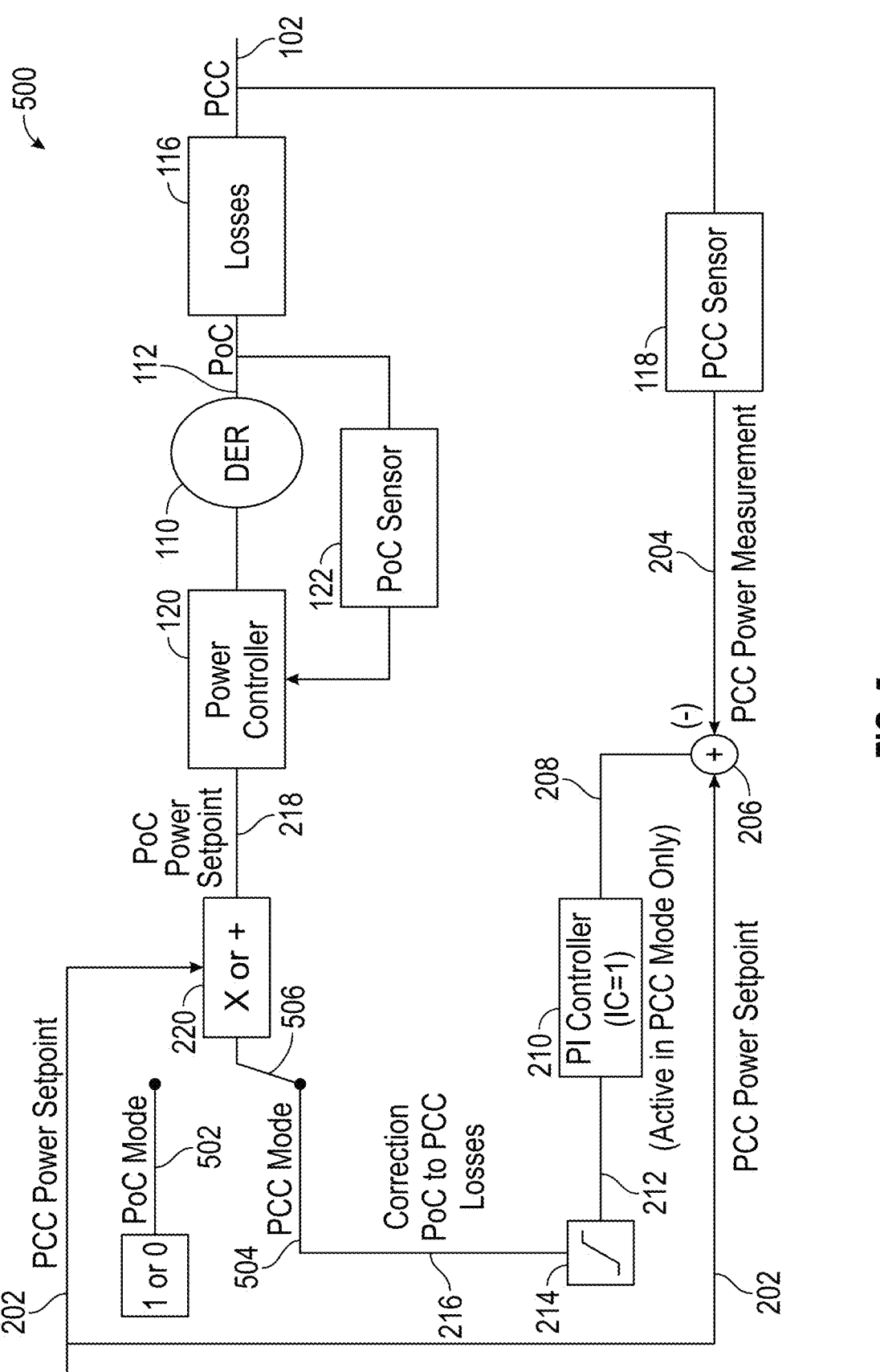
FIG. 5 is a simplified diagram of another example of a control scheme for controlling a single distributed energy resource (DER) at an electrical interconnection between an electric utility grid and a customer's electrical system.

FIG. 5 is a simplified diagram of another example of a control scheme for controlling a single distributed energy resource (DER) at an electrical interconnection between an electric utility grid and a customer's electrical system. FIG. 5 depicts an example of PoC-PCC correction controls for a single DER. Various components of the control scheme 500 of FIG. 5 are similar to components of the control scheme 200 of FIG. 2 and, as such, similar reference numbers are used. For brevity, these components will not be described in detail again.

The control scheme 500 can include a PoC control mode 502 and a PCC control mode 504, where the PCC control mode 504 adjusts a PoC setpoint and where PoC control mode 502 bypasses such an adjustment and provides a correction factor of 1. For configurations where the losses between the PoC and the PCC at the interconnection 116 in FIG. 1 are negligible, the controller, such as the DER controller 120 of FIG. 1, can disable the PoC-PCC correction controls and place the control scheme 500 in a PoC control mode with the PoC-PCC correction factor taking a value of 1.

Like in FIG. 2, the controller determines a difference between the PCC power measurement 204 and the PCC power setpoint 202, as represented by the summing node 206. Then, when the difference between the PCC power measurement 204 and the PCC power setpoint 202 is less than a threshold value, the controller sets the PoC setpoint, e.g., the PoC power setpoint 218, equal to the PCC setpoint, e.g., the PCC power setpoint 202. Setting the PoC power setpoint 218 equal to the PCC power setpoint 202 is graphically depicted in FIG. 5 by a switch 506 that can be toggled to the PoC control mode 502 such that a value of 1 is applied to the combiner circuit 220 when the combiner circuit 220 is configured for multiplying, or a value of 0 when the combiner circuit 220 is configured for addition, instead of a correction factor. When PCC-PoC compensation is not desirable, the switch 506 is toggled to PoC control mode 502. If multiplication is used, a value of "1" is used, i.e., it does not compensate. If addition is used, a value of "0" is added, i.e., it does not compensate.

Figure 6:
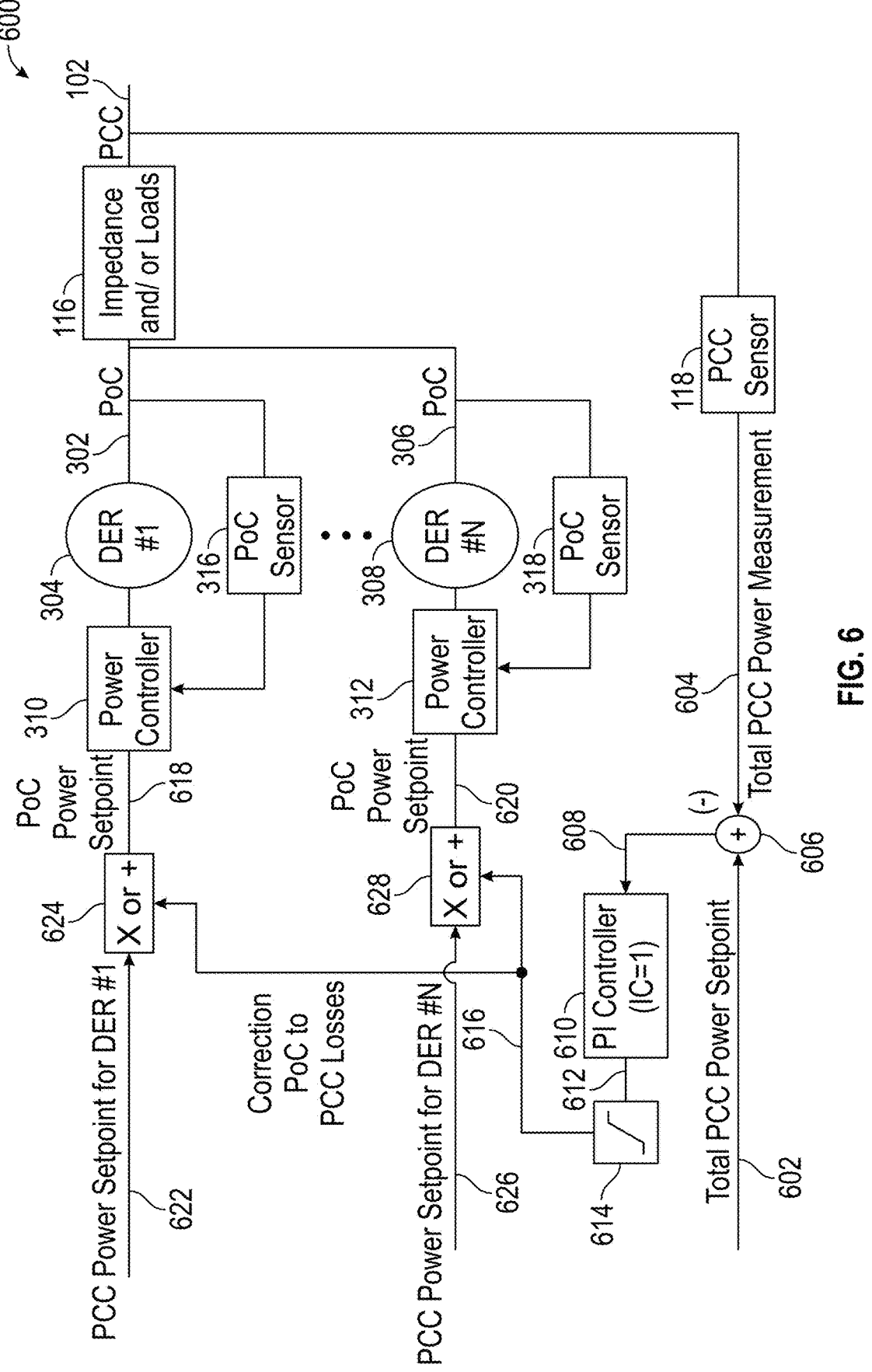
FIG. 6 is a simplified diagram of another example of a control scheme for controlling multiple distributed energy resources (DERs) at an electrical interconnection between an electric utility grid and a customer's electrical system, such as shown in FIG. 3.

FIG. 6 is a simplified diagram of another example of a control scheme for controlling multiple distributed energy resources (DERs) at an electrical interconnection between an electric utility grid and a customer's electrical system, such as shown in FIG. 3. FIG. 6 depicts an example of PoC-PCC correction controls for multiple DER using a single correction factor that is applied to the first PoC setpoint, the second PoC setpoint, and so forth to the Nth PoC setpoint. Various components of the control scheme 600 of FIG. 6 are similar to components of the control scheme 200 of FIG. 2, as such, similar reference numbers are used. For brevity, these components will not be described in detail again.

The configuration shown in FIG. 6 depicts an example in which the situation where multiple DERs are connected and there are losses between the PoCs and PCC. In some examples, a supervisory controller, such as the plant controller 320 of FIG. 3, is used to dispatch the power allocation between DERs. This case is example of an interconnection with losses between the PoC and PCC and single remote sensing at the PCC for the aggregate generating capacity of all the DERs. The correction factor can be generated by the supervisory controller and provided to each unit.

A controller, such as the plant controller 320 of FIG. 3, can determine a total PCC setpoint, such as a total PCC power setpoint 602, and determine a PCC power measurement, such as a total PCC power measurement 604, based on the electrical parameters measured by the sensors 118 of FIG. 1. The controller can then determine a difference between the total PCC power setpoint 602 and the total PCC power measurement 604, such as represented by a summing node 606 in FIG. 6.

In some examples, the difference 608 between the total PCC power setpoint 602 and the total PCC power measurement 604 can be applied to a proportional-integral (PI) controller, such as the PI controller 610 of FIG. 6, which can form part of the controller. The PI controller 610 generates a correction factor 612 to compensate for differences between the PoC and PCC. Optionally, the control scheme 600 further includes a limiter 614, similar to the limiter 214 of FIG. 2, that, for brevity, will not be described in detail again. The limiter 614 can generate a restricted correction factor 616.

Using the techniques of FIG. 6, the plant controller 320 can transmit the correction factor, e.g., the restricted correction factor 616 (if the limiter 614 is present) or the correction factor 612, to the first DER controller 310 and second DER controller 312. The first DER controller 310 applies the correction factor to the first PoC setpoint, e.g., the first PoC power setpoint 618, and the second DER controller 312 applies the correction factor to the second PoC setpoint, e.g., the second PoC power setpoint 620. For example, the correction factor and a PCC setpoint for the first DER 304, e.g., a PCC power setpoint for a first DER 622, can be applied by the first DER controller 310 to a first combiner circuit 624 to generate an adjusted PoC setpoint, e.g., the first PoC power setpoint 618. In some examples, the first combiner circuit 624 is configured for multiplying, and in other examples, the first combiner circuit 624 is configured for addition. Similarly, the same correction factor and a PCC setpoint for the second DER 308, e.g., a PCC power setpoint for a second DER 626, can be applied by the second DER controller 312 to a second combiner circuit 628 to generate an adjusted PoC setpoint, e.g., the second PoC power setpoint 620. In some examples, the second combiner circuit 628 is configured for multiplying, and in other examples, the second combiner circuit 628 is configured for addition.

Then, each controller can generate a control signal to adjust an electrical parameter at the PoC to achieve the adjusted PoC setpoint. For example, the first DER controller 310 can generate a control signal 322 to increase a power output of one or more of the DERs, such as a genset. In other examples, the second DER controller 312 can generate a control signal 324 to increase a power output of one or more of the DERs, such as a genset.

It should be noted that although described with respect to two DERs for brevity, the techniques of FIG. 6 are applicable to N DERs.

Figure 7:
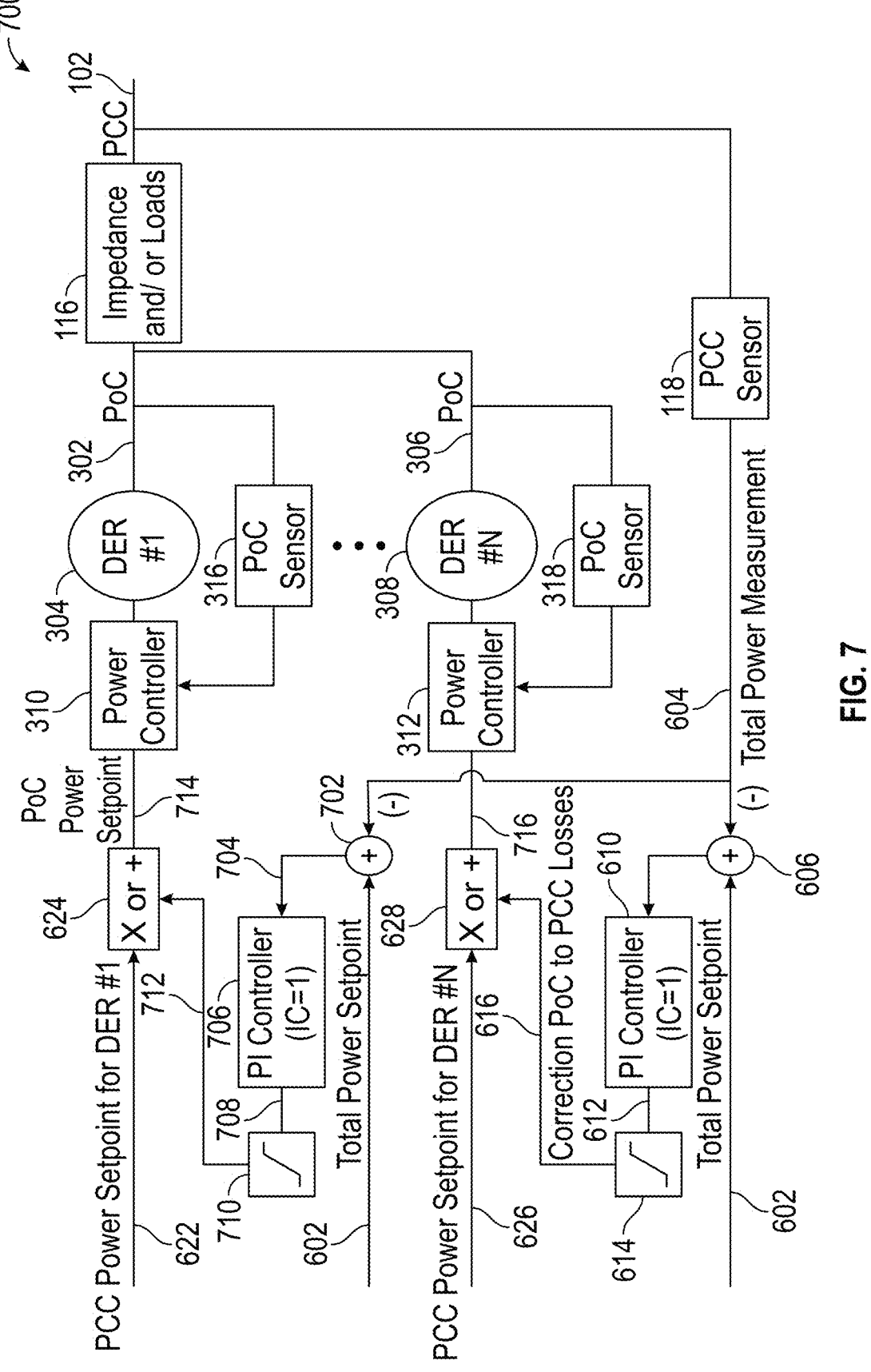
FIG. 7 is a simplified diagram of another example of a control scheme for controlling multiple distributed energy resources (DERs) at an electrical interconnection between an electric utility grid and a customer's electrical system, such as shown in FIG. 3.

In other examples, instead of using a single correction factor, such as in FIG. 6, the PoC-PCC correction factor can be individually implemented, such as shown in FIG. 7.

FIG. 7 is a simplified diagram of another example of a control scheme for controlling multiple distributed energy resources (DERs) at an electrical interconnection between an electric utility grid and a customer's electrical system, such as shown in FIG. 3. FIG. 7 depicts an example of PoC-PCC correction controls for multiple DER using corresponding correction factors. Various components of the control scheme 700 of FIG. 7 are similar to components of the control scheme 600 of FIG. 6, as such, similar reference numbers are used. For brevity, these components will not be described in detail again.

As seen in FIG. 7 and in contrast to FIG. 6, the control scheme 700 includes a second summing node 702 that can determine a difference between the total PCC power setpoint 602 and the total PCC power measurement 604. In some examples, the difference 704 between the total PCC power setpoint 602 and the total PCC power measurement 604 can be applied to a second proportional-integral (PI) controller, such as the PI controller 706 of FIG. 7, which can form part of the controller. The second PI controller 706 generates a second correction factor 708 to compensate for differences between the PoC and PCC. Optionally, the control scheme 700 further includes a second limiter 710, similar to the limiter 214 of FIG. 2, that, for brevity, will not be described in detail again. The limiter 710 can generate a restricted correction factor 712.

The correction factor, e.g., the restricted correction factor 712 (if the limiter 710 is present) or the correction factor 708, is applied to the first PoC setpoint, e.g., the first PoC power setpoint 714. For example, the correction factor and a PCC setpoint for the first DER 304, e.g., a PCC power setpoint for a first DER 622, can be applied to a first combiner circuit 624 to generate an adjusted PoC setpoint, e.g., the first PoC power setpoint 714.

Using the techniques of FIG. 7, a different correction factor is determined and applied to a PCC setpoint for the second DER 308, e.g., a PCC power setpoint for a second DER 626. The second correction factor, e.g., the restricted correction factor 616 (if the limiter 614 is present) or the correction factor 612, is applied to a second PoC setpoint, e.g., the second PoC power setpoint 716. For example, the second correction factor and a PCC setpoint for the second DER 308, e.g., PCC power setpoint for a second DER 626, can be applied to a second combiner circuit 628 to generate an adjusted PoC setpoint, e.g., the second PoC power setpoint 716. In this manner, the controller determines, based on a measured electrical parameter, a first correction factor to be applied to the first PoC setpoint and a second correction factor to be applied the second PoC setpoint.

Then, each controller can generate a control signal to adjust an electrical parameter at the PoC to achieve the adjusted PoC setpoint. For example, the first DER controller 310 can generate a control signal 322 to increase a power output of one or more of the DERs, such as a genset. In other examples, the second DER controller 312 can generate a control signal 324 to increase a power output of one or more of the DERs, such as a genset.

Figure 8:
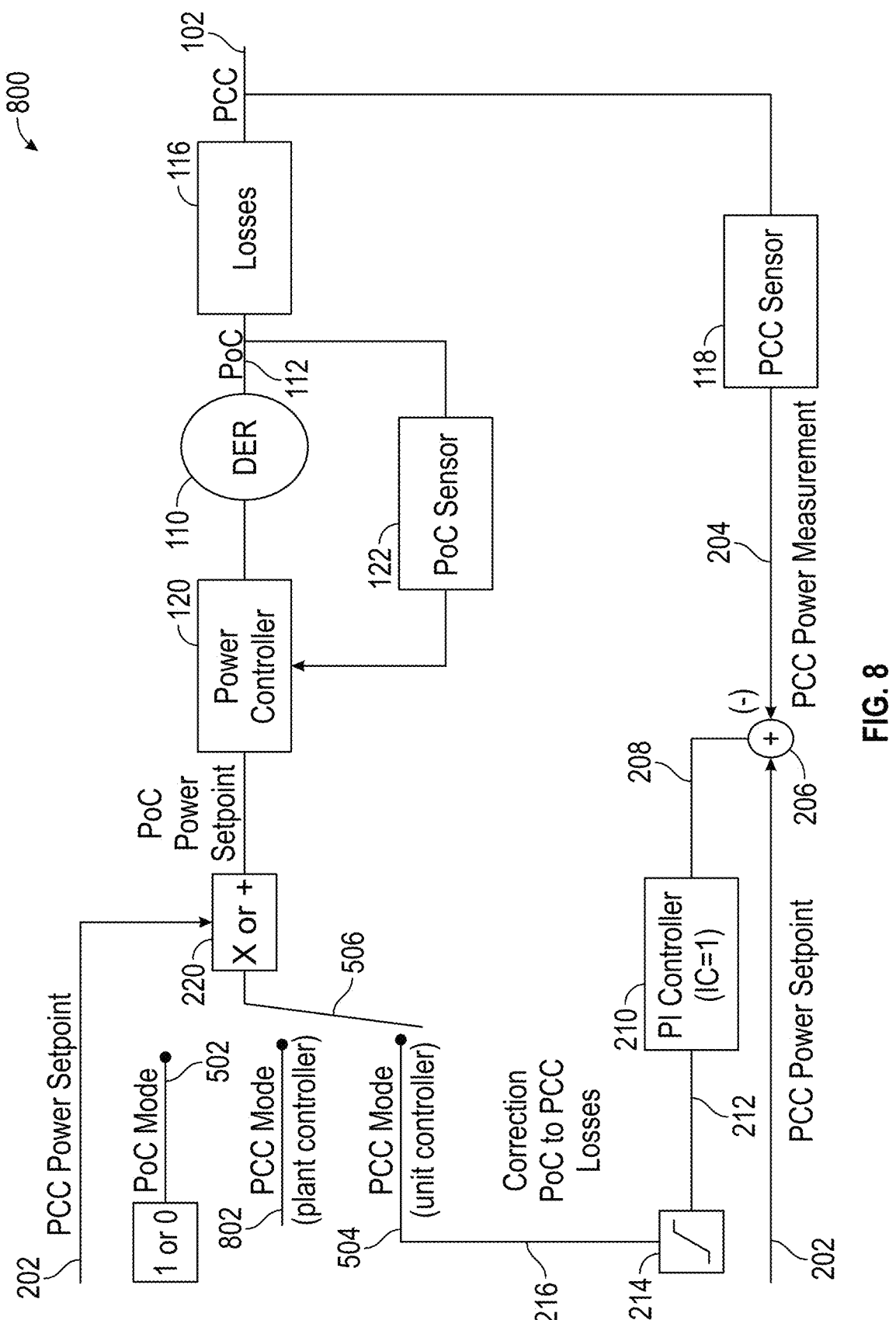
FIG. 8 is a simplified diagram of another example of a control scheme for controlling a single distributed energy resource (DER) at an electrical interconnection between an electric utility grid and a customer's electrical system.

FIG. 8 is a simplified diagram of another example of a control scheme for controlling a single distributed energy resource (DER) at an electrical interconnection between an electric utility grid and a customer's electrical system. FIG. 8 depicts an example of PoC-PCC correction controls for a single DER. Various components of the control scheme 800 of FIG. 8 similar to components of the control scheme 500 of FIG. 5 and, as such, similar reference numbers are used. For brevity, these components will not be described in detail again.

The configuration in FIG. 8 shows a combined implementation in which a local DER controller may be configured to operate in a PoC control mode 502, locally generate the correction factor at the unit level in PCC control mode 504, or receive the PCC correction factor from an external controller, e.g., the plant controller 320 of FIG. 3, in a plant level PCC control mode 802.

FIG. 9 is a flow diagram of an example of a method for controlling a distributed energy resource (DER) at an interconnection between an electric utility grid and a customer's electrical system. At block 902, the method 900 includes measuring an electrical parameter at a point of common coupling (PCC), wherein the PCC is coupled between the electric utility grid and a first electric bus.

At block 904, the method 900 includes to compensate for electrical differences the PCC and a point of connection (PoC) coupled between the customer's electrical system and a second electric bus, determining, based on the measured electrical parameter, an adjustment to a PoC setpoint to achieve a PCC setpoint.

At block 906, the method 900 includes generating a control signal to adjust an electrical parameter at the PoC to achieve the adjusted PoC setpoint.

Various Aspects

Aspect 1 can include or use subject matter (e.g., a system, apparatus, method, article, or the like) that can include or use a system for controlling a distributed energy resource (DER) at an electrical interconnection between an electric utility grid and a customer's electrical system, the system comprising: a point of common coupling (PCC) coupled between the electric utility grid and a first electric bus; a point of connection (PoC) coupled between the customer's electrical system and a second electric bus, wherein the PoC and the PCC are electrically coupled; a sensor electrically coupled with the PCC and configured for measuring an electrical parameter at the PCC; and a controller configured for: determining, based on the measured electrical parameter, an adjustment to a PoC setpoint to adjust a value of the electrical parameter at the PCC so as to approximate or equal a PCC setpoint; and generating a control signal to adjust an electrical parameter at the PoC to achieve the adjusted PoC setpoint.

Aspect 2 can include or use or can optionally be combined with at least some features of one or more of the preceding Aspects to include or use the system wherein the PCC setpoint is a PCC power setpoint, and wherein the controller configured for determining, based on the measured electrical parameter, the adjustment to the PoC setpoint to achieve the PCC setpoint is configured for: determining a PCC power measurement and a PCC power setpoint; and determining a difference between the PCC power measurement and the PCC power setpoint.

Aspect 3 can include or use or can optionally be combined with at least some features of one or more of the preceding Aspects to include or use the system wherein the controller is configured for: determining a difference between the PCC power measurement and the PCC power setpoint; and when the difference between the PCC power measurement and the PCC power setpoint is less than a threshold value, setting the PoC setpoint equal to the PCC setpoint.

Aspect 4 can include or use or can optionally be combined with at least some features of one or more of the preceding Aspects to include or use the system wherein the PCC power measurement includes an active power measurement.

Aspect 5 can include or use or can optionally be combined with at least some features of one or more of the preceding Aspects to include or use the system wherein the PCC power measurement includes a reactive power measurement.

Aspect 6 can include or use or can optionally be combined with at least some features of one or more of the preceding Aspects to include or use the system wherein the PoC is a first PoC, wherein the first PoC is associated with a first DER, and wherein the PoC setpoint is a first PoC setpoint, the system further comprising: a second PoC coupled between the customer's electrical system and the second electric bus, wherein the second PoC is associated with a second DER, wherein the controller is configured for receiving an allocation of power corresponding to the first DER and to the second DER, and wherein the controller configured for determining, based on the measured electrical parameter, the adjustment to the PoC setpoint to achieve the PCC setpoint is configured for: determining, based on the allocation of power corresponding to the first DER and the second DER, the first PoC setpoint and the second PoC setpoint.

Aspect 7 can include or use or can optionally be combined with at least some features of one or more of the preceding Aspects to include or use the system wherein the PoC is a first PoC, wherein the first PoC is associated with a first DER, and wherein the PoC setpoint is a first PoC setpoint, the system further comprising: a second PoC coupled between the customer's electrical system and the second electric bus, wherein the second PoC is associated with a second DER, wherein the controller configured for determining, based on the measured electrical parameter, the adjustment to the PoC setpoint to achieve the PCC setpoint is configured for: determining, based on the measured electrical parameter, a correction factor applied to both the first PoC setpoint and the second PoC setpoint.

Aspect 8 can include or use or can optionally be combined with at least some features of one or more of the preceding Aspects to include or use the system wherein the PoC is a first PoC, wherein the first PoC is associated with a first DER, and wherein the PoC setpoint is a first PoC setpoint, the system further comprising: a second PoC coupled between the customer's electrical system and the second electric bus, wherein the second PoC is associated with a second DER, wherein the controller configured for determining, based on the measured electrical parameter, the adjustment to the PoC setpoint to achieve the PCC setpoint is configured for: determining, based on the measured electrical parameter, a first correction factor to be applied to the first PoC setpoint and a second correction factor to be applied the second PoC setpoint.

Aspect 9 can include or use or can optionally be combined with at least some features of one or more of the preceding Aspects to include or use the system further comprising: an electrical impedance coupled between the PCC and the PoC, wherein the controller configured for generating a control signal to adjust an electrical parameter at the PoC to achieve the adjusted PoC setpoint is configured for: generating the control signal to adjust the electrical parameter at the PoC to achieve the adjusted PoC setpoint to compensate for losses due to the electrical impedance.

Aspect 10 can include or use subject matter (e.g., a system, apparatus, method, article, or the like) that can include or use a method for controlling a distributed energy resource (DER) at an interconnection between an electric utility grid and a customer's electrical system, the method comprising: measuring an electrical parameter at a point of common coupling (PCC), wherein the PCC is coupled between the electric utility grid and a first electric bus; to compensate for electrical differences the PCC and a point of connection (PoC) coupled between the customer's electrical system and a second electric bus, determining, based on the measured electrical parameter, an adjustment to a PoC setpoint to achieve a PCC setpoint; and generating a control signal to adjust an electrical parameter at the PoC to achieve the adjusted PoC setpoint.

Aspect 11 can include or use or can optionally be combined with at least some features of one or more of the preceding Aspects to include or use the method wherein the PCC setpoint is a PCC power setpoint, and wherein determining, based on the measured electrical parameter, the adjustment to the PoC setpoint to achieve the PCC setpoint comprises: determining a PCC power measurement and a PCC power setpoint; and determining a difference between the PCC power measurement and the PCC power setpoint.

Aspect 12 can include or use or can optionally be combined with at least some features of one or more of the preceding Aspects to include or use the method further comprising: determining a difference between the PCC power measurement and the PCC power setpoint; and when the difference between the PCC power measurement and the PCC power setpoint is less than a threshold value, setting the PoC setpoint equal to the PCC setpoint.

Aspect 13 can include or use or can optionally be combined with at least some features of one or more of the preceding Aspects to include or use the method wherein the PCC power measurement includes an active power measurement.

Aspect 14 can include or use or can optionally be combined with at least some features of one or more of the preceding Aspects to include or use the method wherein the PCC power measurement includes a reactive power measurement.

Aspect 15 can include or use or can optionally be combined with at least some features of one or more of the preceding Aspects to include or use the method wherein the PoC is a first PoC, wherein the first PoC is associated with a first DER, wherein the PoC setpoint is a first PoC setpoint, wherein a second PoC is coupled between the customer's electrical system and the second electric bus, and wherein the second PoC is associated with a second DER, the method further comprising: receiving an allocation of power corresponding to the first DER and to the second DER, and wherein determining, based on the measured electrical parameter, the adjustment to the PoC setpoint to achieve the PCC setpoint includes: determining, based on the allocation of power corresponding to the first DER and the second DER, the first PoC setpoint and the second PoC setpoint.

Aspect 16 can include or use or can optionally be combined with at least some features of one or more of the preceding Aspects to include or use the method wherein the PoC is a first PoC, wherein the first PoC is associated with a first DER, wherein the PoC setpoint is a first PoC setpoint, wherein a second PoC is coupled between the customer's electrical system and the second electric bus, and wherein the second PoC is associated with a second DER, the method comprising: wherein determining, based on the measured electrical parameter, the adjustment to the PoC setpoint to achieve the PCC setpoint includes: determining, based on the measured electrical parameter, a correction factor applied to both the first PoC setpoint and the second PoC setpoint.

Aspect 17 can include or use or can optionally be combined with at least some features of one or more of the preceding Aspects to include or use the method wherein the PoC is a first PoC, wherein the first PoC is associated with a first DER, wherein the PoC setpoint is a first PoC setpoint, wherein a second PoC coupled between the customer's electrical system and the second electric bus, and wherein the second PoC is associated with a second DER, the method comprising: wherein the controller configured for determining, based on the measured electrical parameter, the adjustment to the PoC setpoint to achieve the PCC setpoint includes: determining, based on the measured electrical parameter, a first correction factor to be applied to the first PoC setpoint and a second correction factor to be applied to the second PoC setpoint.

Aspect 18 can include or use or can optionally be combined with at least some features of one or more of the preceding Aspects to include or use the method wherein an electrical impedance is coupled between the PCC and the PoC, and wherein generating the control signal to adjust an electrical parameter at the PoC to achieve the adjusted PoC setpoint includes: generating the control signal to adjust the electrical parameter at the PoC to achieve the adjusted PoC setpoint to compensate for losses due to the electrical impedance.

Aspect 19 can include or use subject matter (e.g., a system, apparatus, method, article, or the like) that can include or use a system for controlling a distributed energy resource (DER) at an electrical interconnection between an electric utility grid and a customer's electrical system, the system comprising: a point of common coupling (PCC) coupled between the electric utility grid and a first electric bus; a point of connection (PoC) coupled between the customer's electrical system and a second electric bus, wherein the PoC and the PCC are electrically coupled; an electrical impedance coupled between the PCC and the PoC; a sensor electrically coupled with the PCC and configured for measuring an electrical parameter at the PCC; and a controller configured for: determining, based on the measured electrical parameter, an adjustment to a PoC setpoint to adjust a value of the electrical parameter at the PCC so as to approximate or equal a PCC setpoint; and generating a control signal to adjust an electrical parameter at the PoC to achieve the adjusted PoC setpoint to compensate for losses due to the electrical impedance.

Aspect 20 can include or use or can optionally be combined with at least some features of one or more of the preceding Aspects to include or use the system wherein the PoC is a first PoC, wherein the first PoC is associated with a first DER, and wherein the PoC setpoint is a first PoC setpoint, the system further comprising: a second PoC coupled between the customer's electrical system and the second electric bus, wherein the second PoC is associated with a second DER, wherein the controller is configured for receiving an allocation of power corresponding to the first DER and to the second DER, and wherein the controller configured for determining, based on the measured electrical parameter, the adjustment to the PoC setpoint to achieve the PCC setpoint is configured for: determining, based on the allocation of power corresponding to the first DER and the second DER, the first PoC setpoint and the second PoC setpoint.

INDUSTRIAL APPLICABILITY

The techniques described above for remote monitoring and control of distributed energy resources has wide applicability across electric power distribution systems. As grids evolve to incorporate more renewable energy sources, distributed generators, energy storage and microgrids, there is an increasing need for methods to maintain voltage regulation and power quality across the entire distribution network. The techniques of this disclosure allow DER operators and utilities to ensure compliance with grid codes and standards specified at the point of common coupling, despite losses occurring between DER connections that are potentially far from the PCC.

The correction control methodology can be incorporated by companies involved in developing and manufacturing DER controllers, whether for individual units or plant-level management systems. The enhanced ability to satisfy grid requirements through PCC monitoring and adjusted PoC operation provides a competitive advantage. The techniques of this disclosure can be applied to generators across a range of power capacities and utilizing different energy sources. The remote sensing and correction factor approach is also compatible with various control schemes and modes.

Furthermore, the techniques of this disclosure can be adopted by electrical utilities and grid operators to facilitate the proliferation of distributed energy resources. Maintaining power quality and reliability is paramount. By enabling DERs to meet PCC standards through adjusted PoC operation, grid stability is maintained while still allowing flexibility in DER placement. Utilities can monitor PCC parameters and provide setpoints to DER operators.

In summary, the techniques of this disclosure has wide applicability for electrical distribution and DER companies to meet evolving grid requirements. The techniques enable robust and optimized integration of distributed resources to support decarbonization and decentralization of power generation. The remote PCC sensing and adaptive PoC control provides a technical solution to maintain grid stability and power quality.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A system for controlling a distributed energy resource (DER) at an electrical interconnection between an electric utility grid and a customer's electrical system, the system comprising:

a point of common coupling (PCC) coupled between the electric utility grid and a first electric bus;

a point of connection (PoC) coupled between the customer's electrical system and a second electric bus, wherein the PoC and the PCC are electrically coupled;

a sensor electrically coupled with the PCC and configured for measuring an electrical parameter at the PCC; and a DER local controller configured for:

determining, based on the measured electrical parameter at the PCC, an adjustment to a PoC power setpoint to adjust a value of the electrical parameter at the PCC so as to approximate or equal a PCC power setpoint; and generating a control signal to adjust an electrical parameter at the PoC to achieve the adjusted PoC power setpoint.

2. The system of claim 1, wherein the DER local controller configured for determining, based on the measured electrical parameter at the PCC, the adjustment to the PoC power setpoint to achieve the PCC power setpoint is configured for:

determining a PCC power measurement and a PCC power setpoint; and determining a difference between the PCC power measurement and the PCC power setpoint.

3. The system of claim 2, wherein the DER local controller is configured for:

determining a difference between the PCC power measurement and the PCC power setpoint; and when the difference between the PCC power measurement and the PCC power setpoint is less than a threshold value, setting the PoC power setpoint equal to the PCC power setpoint.

4. The system of claim 2, wherein the PCC power measurement includes an active power measurement.

5. The system of claim 2, wherein the PCC power measurement includes a reactive power measurement.

6. The system of claim 1, wherein the PoC is a first PoC, wherein the first PoC is associated with a first DER, and wherein the PoC power setpoint is a first PoC power setpoint, the system further comprising:

a second PoC coupled between the customer's electrical system and the second electric bus, wherein the second PoC is associated with a second DER, wherein the DER local controller for each DER is configured for receiving an allocation of power corresponding to the first DER and to the second DER, respectively, and wherein each DER local controller is configured for determining, based on the measured electrical parameter, the adjustment to the PoC power setpoint to achieve the PCC power setpoint and is further configured for:

determining, based on the allocation of power corresponding to the first DER and the second DER, the first PoC power setpoint and a second PoC power setpoint.

7. The system of claim 1, wherein the PoC is a first PoC, wherein the first PoC is associated with a first DER, and wherein the PoC power setpoint is a first PoC power setpoint, the system further comprising:

a second PoC coupled between the customer's electrical system and the second electric bus, wherein the second PoC is associated with a second DER, wherein the DER local controller is configured for determining, based on the measured electrical parameter, the adjustment to the corresponding PoC power setpoint to achieve the PCC power setpoint and is further configured for:

determining, based on the measured electrical parameter, a corresponding correction factor applied to both the first PoC power setpoint and the second PoC power setpoint.

8. The system of claim 1, wherein the PoC is a first PoC, wherein the first PoC is associated with a first DER, and wherein the PoC power setpoint is a first PoC setpoint, the system further comprising:

a second PoC coupled between the customer's electrical system and the second electric bus, wherein the second PoC is associated with a second DER, wherein each DER local controller is configured for determining, based on the measured electrical parameter, the adjustment to the corresponding PoC power setpoint to achieve the PCC power setpoint and is further configured for:

determining, based on the measured electrical parameter, a first correction factor to be applied to the first PoC power setpoint and a second correction factor to be applied to a second PoC power setpoint.

9. The system of claim 1, further comprising:

an electrical impedance coupled between the PCC and the PoC, wherein the DER local controller configured for generating a control signal to adjust an electrical parameter at the PoC to achieve the adjusted PoC power setpoint is configured for:

generating the control signal to adjust the electrical parameter at the PoC to achieve the adjusted PoC power setpoint to compensate for losses due to the electrical impedance.

10. A method for controlling a distributed energy resource (DER) at an interconnection between an electric utility grid and a customer's electrical system, the method comprising:

measuring an electrical parameter at a point of common coupling (PCC), wherein the PCC is coupled between the electric utility grid and a first electric bus, to compensate for electrical differences the PCC and a point of connection (PoC) coupled between the customer's electrical system and a second electric bus, determining, using a DER local controller and based on the measured electrical parameter at the PCC, an adjustment to a POC power setpoint to achieve a PCC power setpoint; and generating, using the DER local controller, a control signal to adjust an electrical parameter at the PoC to achieve the adjusted PoC power setpoint.

11. The method of claim 10, wherein determining, based on the measured electrical parameter at the PCC, the adjustment to the PoC power setpoint to achieve the PCC power setpoint comprises:

determining a PCC power measurement and a PCC power setpoint; and determining a difference between the PCC power measurement and the PCC power setpoint.

12. The method of claim 11, further comprising:

determining a difference between the PCC power measurement and the PCC power setpoint; and when the difference between the PCC power measurement and the PCC power setpoint is less than a threshold value, setting the PoC power setpoint equal to the PCC power setpoint.

13. The method of claim 11, wherein the PCC power measurement includes an active power measurement.

14. The method of claim 11, wherein the PCC power measurement includes a reactive power measurement.

15. The method of claim 10, wherein the PoC is a first PoC, wherein the first PoC is associated with a first DER, wherein the PoC power setpoint is a first PoC power setpoint, wherein a second PoC is coupled between the customer's electrical system and the second electric bus, and wherein the second PoC is associated with a second DER, the method further comprising:

receiving an allocation of power corresponding to the first DER and to the second DER, respectively, and wherein determining, based on the measured electrical parameter at the PCC, the adjustment to the PoC power setpoint to achieve the PCC power setpoint includes:

determining, based on the allocation of power corresponding to the first DER and the second DER, the first PoC power setpoint and a second PoC power setpoint.

16. The method of claim 10, wherein the PoC is a first PoC, wherein the first PoC is associated with a first DER, wherein the PoC power setpoint is a first PoC power setpoint, wherein a second PoC is coupled between the customer's electrical system and the second electric bus, and wherein the second PoC is associated with a second DER, the method comprising:

wherein determining, based on the measured electrical parameter at the PCC, the adjustment to the PoC power setpoint to achieve the PCC power setpoint includes:

determining, based on the measured electrical parameter at the PCC, a correction factor applied to both the first PoC power setpoint and a second PoC power setpoint.

17. The method of claim 10, wherein the PoC is a first PoC, wherein the first PoC is associated with a first DER, wherein the PoC power setpoint is a first PoC power setpoint, wherein a second PoC coupled between the customer's electrical system and the second electric bus, and wherein the second PoC is associated with a second DER, the method comprising:

wherein the DER local controller configured for determining, based on the measured electrical parameter at the PCC, the adjustment to the PoC power setpoint to achieve the PCC power setpoint includes:

determining, based on the measured electrical parameter at the PCC, a first correction factor to be applied to the first PoC power setpoint and a second correction factor to be applied a second PoC power setpoint.

18. The method of claim 10, wherein an electrical impedance is coupled between the PCC and the PoC, and wherein generating, using the DER local controller, the control signal to adjust an electrical parameter at the PoC to achieve the adjusted PoC power setpoint includes:

generating, using the DER local controller, the control signal to adjust the electrical parameter at the PoC to achieve the adjusted PoC power setpoint to compensate for losses due to the electrical impedance.

19. A system for controlling a distributed energy resource (DER) at an electrical interconnection between an electric utility grid and a customer's electrical system, the system comprising:

a point of common coupling (PCC) coupled between the electric utility grid and a first electric bus;

a point of connection (PoC) coupled between the customer's electrical system and a second electric bus, wherein the PoC and the PCC are electrically coupled;

an electrical impedance coupled between the PCC and the PoC;

a sensor electrically coupled with the PCC and configured for measuring an electrical parameter at the PCC; and a DER local controller configured for:

determining, based on the measured electrical parameter at the PCC, an adjustment to a PoC power setpoint to adjust a value of the electrical parameter at the PCC so as to approximate or equal a PCC power setpoint, and generating a control signal to adjust an electrical parameter at the PoC to achieve the adjusted PoC power setpoint to compensate for losses due to the electrical impedance.

20. The system of claim 19, wherein the PoC is a first PoC, wherein the first PoC is associated with a first DER, and wherein the PoC power setpoint is a first PoC setpoint, the system further comprising:

a second PoC coupled between the customer's electrical system and the second electric bus, wherein the second PoC is associated with a second DER, wherein the DER local controller is configured for receiving an allocation of power corresponding to the first DER and to the second DER, and wherein the DER local controller configured for determining, based on the measured electrical parameter at the PCC, the adjustment to the PoC power setpoint to achieve the PCC power setpoint is configured for:

determining, based on the allocation of power corresponding to the first DER and the second DER, the first PoC power setpoint and the second PoC power setpoint.

* * * * *